Figure 1:
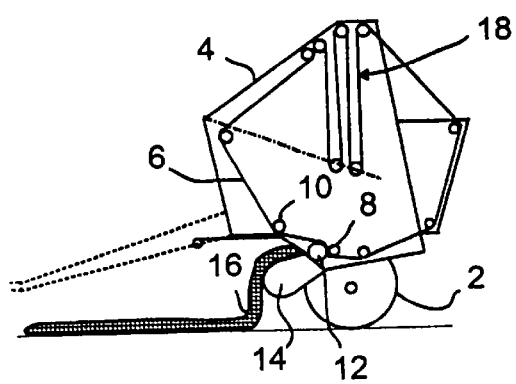

United States Patent
Madsen

[11] Patent Number: 5,930,980
[45] Date of Patent: Aug. 3, 1999

[54] METHOD AND A UNIT FOR PRODUCING ROUND BALES OF STRAW OR OF LIKE MATERIAL WITH FILM WRAPPING

[76] Inventor: Kurt Ertbølle Madsen, DK-66880, Tarm, Denmark

[21] Appl. No.: 09/011,067
[22] PCT Filed: Aug. 12, 1996
[86] PCT No.: PCT/DK96/00346
§ 371 Date: Feb. 10, 1998
§ 102(e) Date: Feb. 10, 1998
[87] PCT Pub. No.: WO97/05767
PCT Pub. Date: Feb. 20, 1997
[51] Int. Cl.[6] .................................................. B65B 11/04
[52] U.S. Cl. .......................... 53/399; 53/430; 53/118; 53/587; 53/389.3
[58] Field of Search .................... 53/593, 587, 399, 53/211, 214, 215, 118, 116, 430, 389.2, 389.3; 56/341

[56] References Cited

U.S. PATENT DOCUMENTS 3,407,565 10/1968 Bender et al. ............................ 53/214
4,296,595 10/1981 Meiners .
4,407,113 10/1983 Core .
4,569,439 2/1986 Freye et al. ............................ 53/587 X
5,079,898 1/1992 Springs et al. .

FOREIGN PATENT DOCUMENTS 0129 021 12/1984 European Pat. Off. .
27 05 101 8/1978 Germany .

OTHER PUBLICATIONS

Patent Abstract of Japan, vol. 14, No. 480, C–771, Abstract of JP A 2–200117 (Takakita Co. Ltd.), Aug. 8, 1990.

*Primary Examiner*—Linda Johnson
*Attorney, Agent, or Firm*—Sixbey, Friedman, Leedom & Ferguson; David S. Safran

[57] ABSTRACT

For various reasons it is attractive to effect a sheet or film wrapping of round bales of straw or similar material, but so far has required the use of a costly special equipment. With the invention the wrapping is effected with a simple film supply device mounted on the round bale producing baler itself, such that the bales are delivered therefrom in ready wrapped condition.

11 Claims, 1 Drawing Sheet

METHOD AND A UNIT FOR PRODUCING ROUND BALES OF STRAW OR OF LIKE MATERIAL WITH FILM WRAPPING

The present invention concerns a method for producing round bales of straw or of like material with film wrapping. It has become a widely used practice to keep straw in the outdoors in the form of bales, in that rows of bales are either covered by a film or are made up of bales provided with a film wrapping for weather protection. Bales to be used as fodder are injected with ammonia and are completely wrapped up, either individually or collectively in a kind of film tube, which requires a relatively expensive apparatus.

However, much of the straw is used as bedding for livestock, and it is sufficient that these bales are wrapped with film around their circumference. This may be effectuated with a perceptibly simplified wrapping apparatus. Moreover, it is also so that round bales for that use are commonly produced by use of baling presses, which are far cheaper than more industrial presses, which mostly are rented through machine pools and used for the production of the larger "big bales" in a round or box-shaped form for ensiling or for different industrial purposes.

More and more it is realized, that the gathering in of straw from the field is becoming so expensive, that soon it will be more profitable just to plough down the straw since it may no longer be burned. This is also the case with straw for bedding, where it is decisively necessary to minimize the gathering costs. As mentioned here, it is true that comparatively inexpensive baling presses and wrapping apparatuses may be used, but the combined costs for the machinery and the expendables belonging thereto, namely binder twine for the round baler and wrapping film for the wrapping apparatus, are very straining for the profitability.

By the present invention it is realized, that these conditions may be perceivably bettered by the fact, that it has been found possible to provide the relevant, conventional round bale presser with a comparatively uncomplicated device, which instead of winding twine around the single finished round bale may wrap the bale up with a length of packing film in such a way that the film wrapping will serve both as a structural stabilization of the round bale and as the required packing of it. Thereby it is not only achieved, that the expendable constituted by the twine may be completely avoided, but also that the use of a separate wrapping apparatus may be abandoned entirely, because its functions are taken over by the combined effect of the film supply device and the baling press itself.

Thereby it is achievable that the relatively simple baler may readily deliver round bales in the shape of already stabilized and relevantly packed items, which in this way may be placed side by side, forming a mainly weatherproof row of protected single bales.

The baling presses in question works in a way, that by driving over the field they continuously collect loose straw by means of a pick-up cylinder, which presses the straw towards a set of running, elastically tightened belts, which yield inwardly as more straw is supplied; a continuously supplied layer of straw will thereby be wound up against the action of the elastic force of the belts, which at last run in an almost closed loop around the produced round bale. Just before it reaches the desired size there is supplied a free end of a twine to the inlet, which twine in this way will be embedded between the hitherto periphery of the bale and the straw layer succeedingly wound up on it. Following less than a further turn of the bale the hauling of the baling press is stopped, while the said belts continue to turn the bale, whereby the bale through 10–15 revolutions is winded with twine from a spool of binder twine, in that the twine spool hereby is displaced sidewardly, so that the winding takes place from edge to edge of the bale's peripheral area. Thereafter the twine is cut off, the twine being selfkeeping after the last several windings, and the bale is delivered to the ground by opening the belt system.

By the invention it is realized that it will be possible to substitute the twine supply with a supply of wrapping film according to quite the same principle, whereby it will also be possible to leave out the twine and, not the less, the complete separate wrapping apparatus, which normally is necessary for the desired packing. Then it is important, that the film can be supplied in just the same simple way as the twine, and that the supply may be stopped not only in the same simple way, but in an even simpler way, in that the preferably used film is a stretch film quite corresponding to the well-known 'domestic' film, which sticks to itself; thereby not even a single wrap around the bale is necessary in order to finally secure a fastening of the wrapped-up material.

Normally it will apply that the film web is delivered from a film roll which is narrower than the width of the bale, why this roll in the same way as the said twine spool should be able to move sidewardly during the wrapping process. Hereby it is important, though, that the wrapping up of the film can be finished with far less revolutions of the bale than by the winding of the twine, since this means that the duration of necessary stops in the straw collecting process may be considerably shortened, resulting in a corresponding increase in the collecting capacity.

On this background the invention will also comprise a winding apparatus for mounting both on existing round baling presses and on such presses, which originally have been provided with such a device.

Figure 2:
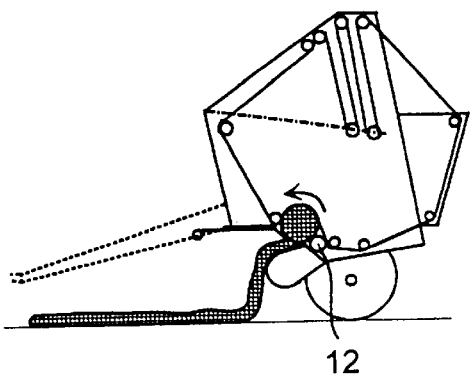
Figure 3:
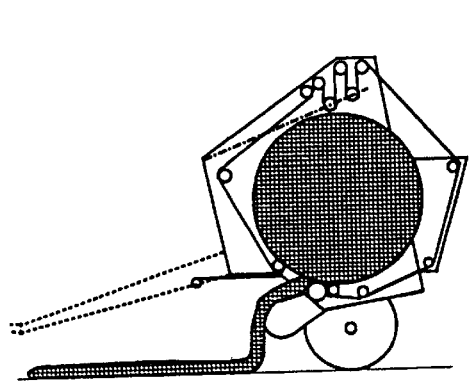
Figure 4:
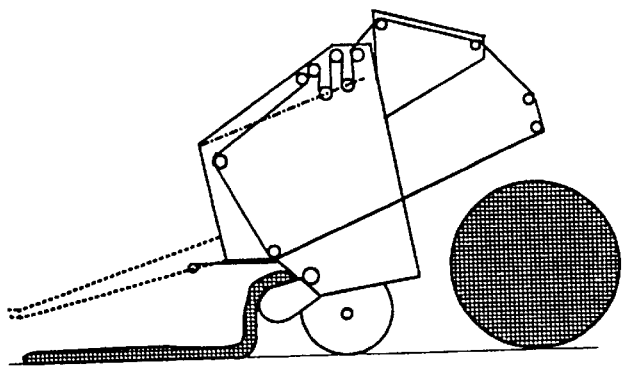
Figure 5:
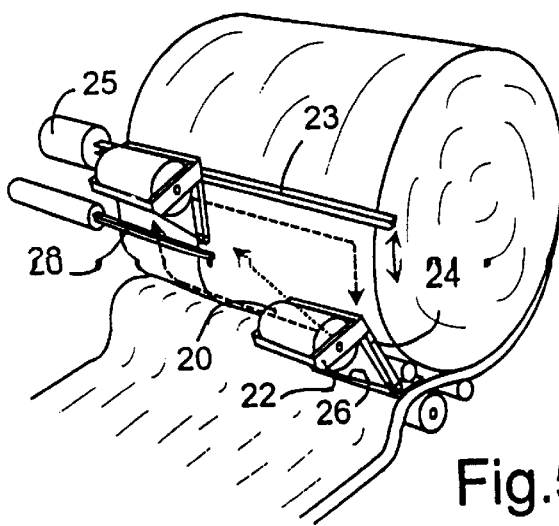
Figure 6:
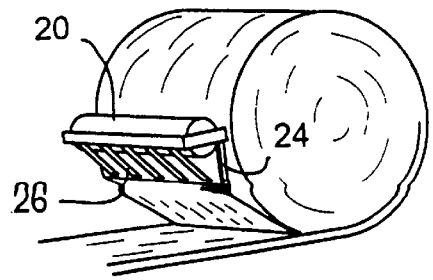

The invention will be explained in more detail in the following with reference to the drawing, where FIG. 1 is a schematic side view of a conventional baling press of a relevant type as shown just before the commencement of the rolling up of a straw bale, FIGS. 2 and 3 are corresponding views shown during the beginning and the finish of a rolling up, FIG. 4 is a corresponding view of the press during delivery of the bale, and FIG. 5 is a schematic perspective view for illustrating the invention, and FIG. 6 is a corresponding view of an amended embodiment.

The baling press shown in FIGS. 1–4 is well-known and shall therefore only be described briefly. On driving wheels 2 there is placed a frame 4, which keeps a circumferential row of guide rollers for a circumferential wrapping and pressing belt 6, and a corresponding system of parallel belts, respectively. Between lower, foremost guide rollers 8 and 10 and just in front of the roller 8 there is placed a fixed pressing roller 12, which is sitting at the outside of the belt 6, and down before this roller there is placed a rotating pick-up roller 14 for the continuous collecting of a loose straw layer 16 from the field and for pressing the straw therein to the area between the rollers 12 and 10. The belt 6 is kept elastically suspended by control through an upper belt tensioning and expansion system 18.

By the said pressing in of the straw the belt section between the rollers 8 and 10 yields inwardly, and by moving the belt in the direction of the arrow in FIG. 2, immediately there will initiated a rolling up of the pressed in layer of straw, whereby the belt loop between the rollers 8 and 10 will be enlarged inwardly, while the belt is freed correspondingly from the tensioning system 18. The straw layer is compressed at the inlet over the pressing roller 12, see FIG. 3, and besides by the elastic tensioning of the belt 6 itself.

When the desired bale size has been achieved, FIG. 3, the hauling is stopped, and after the previously mentioned winding up of the bale with twine by which the bale is rotated 10–15 times, the finished bale is delivered by opening the baling press as shown in a self-explaining way on FIG. 4, after which the procedure may be recommenced.

By the present invention all of the binder twine arrangement may be omitted, since instead there may be utilized an additional equipment as indicated in FIG. 5, where this equipment is shown in a initial position at the bottom of the right side and in a final position at the top of the left side. The equipment consists of a film roll 20 carried by a supporting frame 22, which is placed horizontally displaceable on a supporting rail 23 and driven by a motor 25 via a not shown threaded spindle. The rail 23 is connected movably up-and-down to the machine frame in a not shown way, as indicated by the double arrow. The supporting frame is hereby movable between the two said positions, which as implied by the punctuated arrows either directly by a sloped course or by a horizontal/vertical course.

The supporting frame 22 has an inner, downwardly projecting back plate 24 having a bottom edge to which the film 19 from the roll 20 can be conveyed together with foremost, elastic holding fingers 26 pressing the unrolled film against the bottom edge of the back plate 24.

At the first time of use it is provided that the film 19 is pulled a bit below the bottom edge of the back plate 24, in that there is commenced with the frame 22 in an elevated position and therefore with a piece of film 21 hanging freely therefrom. When the first bale is about to finish winding up, the frame 22—preferably with an automatic control—is actuated to be moved to its lowered position in the right side, whereby the hanging film end 21 is brought in abutment against the straw flow 16 and together with this is inserted over the pressing roller 12 to a squeezed position between the hitherto outside of the bale and the newly supplied layer 16. Thereby the film end is anchored in the bale, and then the hauling is stopped.

However, the rotation of the bale is continued by means of the driven belt 6, and thereby the film 19 will be pulled out for an initial wrapping up of the bale. During the further rotation the frame 22 is displaced tranversely, either slantingly upwards against the elevated position in the left side or horizontally to the left, in that the elevation to a higher final level then may happen at any time including at the beginning or the termination of the wrapping. The wrapping up with a few overlapping film windings may be finished by relatively few revolutions of the bale, e.g. only 5–8 revolutions, and the rotation is stopped when the frame 22 has reached its left, elevated position.

Now the whole of the outer surface of the bale is covered with film, and the film 19 is suspended between the bottom edge area of the back plate 24 and the inlet just below the roller 10. Hereby there is an opportunity to cut off the film somewhere in this section, so that thereby the desired hanging film end can be created before the beginning of the next wrapping operation. This may be done with a shearing beam 28, which has a movable knife 30 for shearing the film or possibly a hot wire for melt-cutting the film.

As film material there is preferably used a thin, slightly sticky stretch-film of the same type as the usual "domestic film". It should be aimed at unrolling the film from the bulk roll with a perceivable resistance against the unrolling, so that a certain stretching of the film takes place. This is important, not the least at the final wrapping, where the tightened film layers on the bale will produce a self-locking sticking engagement, so that automatically there is achieved a sufficient fastening of the outer end of the film.

By experiments it has appeared, that the cutting off of the film may be done without the said special shearing, i.e. quite without use of the shearing beam 28, namely by shortly applying a brake to the unrolling of the film from the roll/frame 20,22. Hereby the film will be subjected to a strong tensile influence from the roller 10, which will act on the film in an outward direction from the inlet of the bale, so that the film is pulled apart close to the roller 10. Thereby the hanging film end 21 to be used at the beginning of the next wrapping operation is formed.

In FIG. 6 there is shown an amended embodiment, where the film roll holder 22 and the film roll 20 are extending over the whole width of the bale, whereby there may be dispensed with the special supporting rail 23 with driving equipment 25 belonging to it. However, the holder 22 should always be supported in a vertically displaceable way with a view to the formation and the activation of the freely hanging film end for an initial engagement with the bale, so that the film web will become narrower by the said stretching of the web, the film roll should have a certain excessive length as compared with the width of the bale.

The embodiment according to FIG. 6 is particularly suitable for use with new baling presses, where an accordance between the bale width and a standard width can be made, while the embodiment according to FIG. 5 is particularly suitable for mounting on presses, where the bale width deviates from the attainable standard widths of the film web material.

I claim:

1. A method for producing round bales of straw with a film wrapping comprising the steps of:

driving a baling press over a field while operating the baling press so as to continuously collect a layer of straw, progressively roll up the layer of straw and simultaneously compress the straw during rolling up thereof;

conveying a free end of a film web in a manner causing the free end to be drawn into a joint face between an outer side of a bale being produced and a final straw layer being rolled on to the bale, said conveying step comprising the step of lowering a film supply roll of the web film, with the free end of the film web hanging down therefrom, and bring the free end of the web into abutment with an upper surface of the straw layer, anchoring the free end within said joint face by the free end being drawn in with said straw layer;

subsequently terminating the intake of the straw layer and rotating the bale to form a full wrapping thereof with the film web; and during or at said full wrapping of the bale with the film web, elevating the film supply roll to a higher position, producing a shearing or tearing off of the film web at a level perceivably below the supply roll and creating a new hanging free end of the film web for use in wrapping of a subsequently rolled bale.

2. Method according to claim 1, wherein said step of producing a shearing or tearing off of the film web is performed by the step of braking rotation of the supply roll during continued rotation of the bale.

3. Method according to claim 1, wherein said film web is perceivably narrower than the bale and wherein the step of raising and laterally displacing the film supply roll is performed during the step of full wrapping of the bale with the film web.

4. Apparatus for producing round bales with a film wrapping having a wrapping unit comprising mounting means for mounting the wrapping unit on a straw layer collecting, round baling press, a holding means for rotatably supporting a film supply roll with a free end of the film hanging down, means for raising and lowering the holding means relative an intake area of the baling press to which the mounting means is attached, in use, between an inactive raised position and an active lowered position, and means for applying the free end of the film against an upper surface of a straw layer being collected into the baling press in said lowered position for enabling the free end of the film to be drawn into a joint face between an outer side of a bale being produced and a final straw layer being rolled on to the bale.

5. Apparatus according to claim 4, wherein said film web is perceivably narrower than the bale to be wrapped therewith; and wherein the means for raising and lowering the holding means comprises means for laterally displacing the holding means for the film supply roll as it is raised from the lowered position toward the raised position for producing full wrapping of the bale with the narrower film web.

6. Apparatus according to claim 4, further comprising means for sheering or tearing off the film web at a perceivable distance below the film supply roll.

7. Apparatus according to claim 4, further comprising means for braking rotation of the film supply roll for effecting rupturing of the film web near the intake area of the baling press in response to further rotation of the bale.

8. A straw layer collecting, round baling press for producing round bales having means for driving the press over a field and for operating the baling press so as to continuously collect a layer of straw, progressively roll up the layer of straw and simultaneously compressing the straw during rolling thereof, having a film wrapping unit, said wrapping unit comprising mounting means for mounting the wrapping unit on the baling press, a holding means for rotatably supporting a film supply roll with a free end of the film hanging down, means for raising and lowering the holding means relative an intake area of the baling press between an inactive raised position and an active lowered position, and means for applying the free end of the film against an upper surface of a straw layer being collected into the baling press in said lowered position for enabling the free end of the film to be drawn into a joint face between an outer side of a bale being produced and a final straw layer being rolled on to the bale.

9. Baling press according to claim 8, wherein the holding means for the film roll is perceivably narrower than the width of the bale; and wherein the means for raising and lowering the holding means comprises means for laterally displacing the holding means for the film supply roll as it is raised from the lowered position toward the raised position for producing full wrapping of the bale with the narrower film web.

10. Baling according to claim 8, further comprising means for shearing or tearing off the film web at a perceivable distance below the film roll.

11. Baling press according to claim 8, further comprising means for braking the rotatability of the film supply roll in order to effect rupturing of the film web near said intake area in response to further rotation of the bale.

\* \* \* \* \*